(12) United States Patent
Lindqvist

(10) Patent No.: US 8,198,899 B2
(45) Date of Patent: Jun. 12, 2012

(54) METHOD AND SYSTEM FOR CALIBRATING STREAMER ELECTRODES IN A MARINE ELECTROMAGNETIC SURVEY SYSTEM

(75) Inventor: Ulf Peter Lindqvist, Segeltorp (SE)

(73) Assignee: PGS Geophysical AS, Lysaker (NO)

( * ) Notice: Subject to any disclaimer, the term of this patent is extended or adjusted under 35 U.S.C. 154(b) by 498 days.

(21) Appl. No.: 12/381,689

(22) Filed: Mar. 16, 2009

(65) Prior Publication Data

US 2010/0231224 A1 Sep. 16, 2010

(51) Int. Cl.
G01V 3/08 (2006.01)
G01V 3/15 (2006.01)
G01R 35/00 (2006.01)

(52) U.S. Cl. ........................................ 324/365; 324/202
(58) Field of Classification Search .................. 324/365, 324/202
See application file for complete search history.

(56) References Cited

U.S. PATENT DOCUMENTS

| | | | |
|---|---|---|---|
| 3,052,836 A * | 9/1962 | Postma | 324/365 |
| 6,236,212 B1 * | 5/2001 | Wynn | 324/365 |
| 6,914,433 B2 | 7/2005 | Wright et al. | |
| 7,026,819 B2 | 4/2006 | Eidesmo et al. | |
| 7,446,535 B1 | 11/2008 | Tenghamn et al. | |
| 7,471,089 B2 * | 12/2008 | Zerilli et al. | 324/365 |
| 7,919,965 B2 * | 4/2011 | Schaug-Pettersen et al. | 324/365 |
| 2003/0024726 A1 * | 2/2003 | Petrenko | 174/110 R |
| 2006/0186887 A1 | 8/2006 | Strack et al. | |
| 2007/0205750 A1 * | 9/2007 | Yakymyshyn et al. | 324/127 |
| 2009/0001986 A1 * | 1/2009 | Besson et al. | 324/335 |
| 2009/0001987 A1 | 1/2009 | Davidsson | |

OTHER PUBLICATIONS

European Search Report for Application No. 10155085.3-1240 / 2230535, Mailing Date: Oct. 24, 2011.

* cited by examiner

Primary Examiner — Jay Patidar

(57) ABSTRACT

A marine electromagnetic sensor system includes a sensor cable having at least one electromagnetic sensor thereon. A first calibration electrode is disposed on the cable on one side of the sensor. A second calibration electrode is disposed on the cable on an opposite side of the sensor. A calibration power supply is coupled to the first and second calibration electrodes. A measuring circuit is coupled to the sensor. A method for calibrating marine electromagnetic survey electrodes includes imparting electric current between calibration electrodes disposed at spaced apart locations on a cable deployed in the water. Voltages impressed across a pair of electrodes disposed on the cable between the calibration electrodes are detected in response to the current. A change in sensitivity of the at least one pair of electrodes is determined using the detected voltages.

10 Claims, 1 Drawing Sheet

← TOWARD VESSEL

METHOD AND SYSTEM FOR CALIBRATING STREAMER ELECTRODES IN A MARINE ELECTROMAGNETIC SURVEY SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic survey apparatus for subsurface exploration in the Earth. More particularly, the invention relates to structures for detector electrodes and arrays thereof for detection of electromagnetic fields resulting from electromagnetic energy imparted into the Earth.

2. Background Art

Electromagnetic surveying is used for, among other purposes, determining the presence of hydrocarbon bearing structures in the Earth's subsurface. Electromagnetic surveying includes what are called "controlled source" survey techniques. Controlled source electromagnetic surveying techniques include imparting a time varying electric current or a time varying magnetic field into the Earth, when such surveys are conducted on land, or imparting such fields into sediments below the water bottom (sea floor) when such surveys are conducted in a marine environment. The techniques include measuring voltages and/or magnetic fields induced in electrodes, antennas and/or magnetometers disposed at the Earth's surface, in the water or on the water bottom. The voltages and/or magnetic fields are induced by interaction of the electromagnetic field caused by the electric current and/or magnetic field imparted into the Earth's subsurface (through the water bottom in marine surveys) with subsurface Earth formations.

One type of marine controlled source electromagnetic surveying known in the art includes imparting alternating electric current into the sediments below the water bottom by applying current from a source, usually disposed on a survey vessel, to a bipole electrode towed by the survey vessel. The bipole electrode is typically an insulated electrical cable having two electrodes thereon at a selected spacing, sometimes 300 to 1000 meters or more. The alternating current has one or more selected frequencies, typically within a range of about 0.1 to 10 Hz. A plurality of detector electrodes is disposed on the water bottom at spaced apart locations, and the detector electrodes are connected to devices that record the voltages induced across various pairs of such electrodes. Such surveying is known as frequency domain controlled source electromagnetic surveying. Frequency domain EM survey techniques are described, for example in U.S. Pat. No. 7,026,819 issued to Eidesmo et al.

Another technique for controlled source electromagnetic surveying of subsurface Earth formations known in the art is transient controlled source electromagnetic surveying. In transient controlled source electromagnetic surveying, electric current is imparted into the Earth's subsurface using electrodes on a cable similar to those explained above as used for frequency domain surveying. The electric current may be direct current (DC). At a selected time or times, the electric current is switched, and induced voltages are measured, typically with respect to time over a selected time interval, using electrodes disposed on the water bottom or towed in the water as previously explained with reference to frequency domain surveying. Structure and composition of the Earth's subsurface are inferred by the time distribution of the induced voltages. Transient electromagnetic surveying techniques are described, for example, in U.S. Pat. No. 6,914,433 issued to Wright et al.

Some types of marine electromagnetic survey systems use pairs of electrodes disposed at spaced apart locations along one or more streamer cables for detecting electric field components of electromagnetic fields in the subsurface. One type of electrode for use in a towed marine streamer is described in U.S. Pat. No. 7,446,535 issued to Tenghamn et al. and assigned to the assignee of the present invention. The electrode pairs are coupled across input terminals or respective preamplifiers, the output of which is communicated to signal processing and recording devices. Another example electrode-type electromagnetic receiver system is disclosed in U.S. Patent Application Publication No. 2009/001987 filed by Davidsson, the underlying patent application for which is assigned to the assignee of the present invention. The system disclosed in the '987 publication includes a plurality of sensor modules each having a single electrode thereon, and a common reference electrode extending between all of the sensor modules. Voltages impressed between the common reference electrode and each of the sensor module electrodes are measured in response to the electric and/or magnetic fields imparted into the subsurface formations below the water bottom.

In marine electromagnetic survey systems such as the foregoing that use electrodes to detect electric field components of electromagnetic fields from the subsurface, it is desirable to be able to determine the response characteristics of the electrodes over time, as such response characteristics may change. It is particularly desirable to be able to characterize electrode response while the sensing cable is still deployed in the water. It is also desirable to be able to monitor motion of electromagnetic sensor cable in the water in order to be able to determine components of the detected and recorded signals that result from electromagnetic induction caused by motion of the sensor cable in the water.

SUMMARY OF THE INVENTION

A marine electromagnetic sensor system according to one aspect of the invention includes an electromagnetic sensor cable having at least one electromagnetic field sensor thereon. A first calibration source electrode is disposed on the cable on one side of the at least one sensor. A second calibration source electrode is disposed on the cable on an opposite side of the at least one sensor. A calibration power supply is functionally coupled to the first and second calibration source electrodes. A measuring circuit is functionally coupled to the at least one sensor.

A method for calibrating marine electromagnetic surveying electrodes according to another aspect of the invention includes imparting an alternating electric current between calibration electrodes disposed at spaced apart locations on a cable deployed in a body of water. Voltages impressed across at least one pair of electrodes disposed between the calibration electrodes are detected in response to the alternating current. A change in sensitivity of the at least one pair of electrodes is determined using the detected voltages.

Other aspects and advantages of the invention will be apparent from the following description and the appended claims.

DETAILED DESCRIPTION

Figure 1:
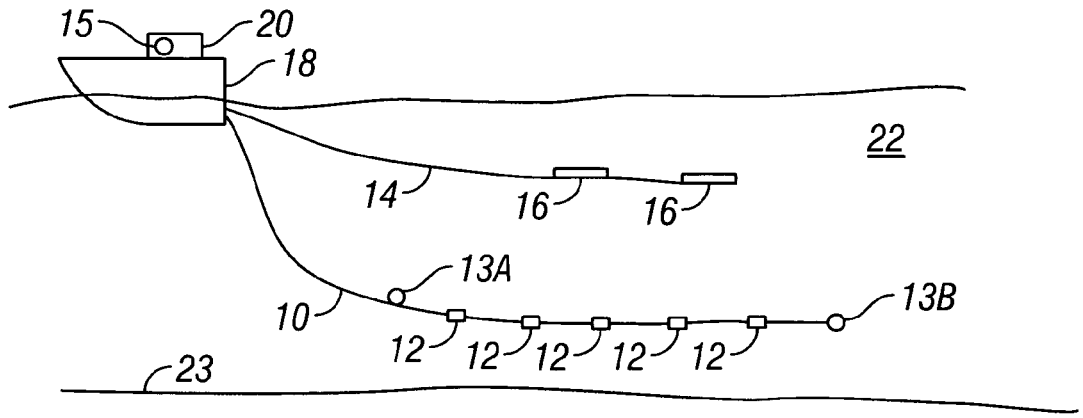
FIG. 1 shows one example of a cable-type electromagnetic receiver system according to the invention.

An example marine electromagnetic survey system is shown generally in FIG. 1. The electromagnetic survey system can include a sensor cable 10 having thereon at spaced apart positions a plurality of sensor modules 12. The sensor modules 12 will be explained in more detail with reference to FIG. 2. The sensor cable 10 is shown being towed by a survey vessel 18 moving on the surface of a body of water 22 such as a lake or the ocean. Towing the sensor cable 10 is only one possible implementation of a sensor cable. It is within the scope of the present invention for the sensor cable 10 to be deployed on the water bottom 23.

The vessel 18 may include thereon equipment, shown generally at 20 and referred to for convenience as a "recording system" that may include devices (none shown separately) for navigation, for energizing electrodes or antennas for imparting an electromagnetic field into the formations below the water bottom 23, and for recording and processing signals generated by the various sensor modules 12 on the sensor cable 10.

The electromagnetic survey system shown includes an electromagnetic field transmitter, which may be a pair of electrodes 16 disposed at spaced apart positions along an electrically insulated source cable 14. The source cable 14 may be towed by the survey vessel 18 or by a different vessel (not shown). The source cable 14 alternatively may be deployed on the water bottom 23. The electrodes 16 may be energized at selected times by an electrical current source (not shown separately) in the recording system 20 or within other equipment (not shown). The electrical current source applies electrical current across the electrodes 16 to induce an electromagnetic field in the formations below the water bottom 23. The electrical current may be monochromatic or may have a plurality of discrete frequencies for frequency domain electromagnetic surveying, or may include forms of switched current for transient electromagnetic surveying, such as switching direct current on or off, reversing its polarity of using a coded switching sequence such as a pseudorandom binary sequence.

The configuration shown in FIG. 1 induces a horizontal dipole electric field in the subsurface when the electrodes 16 are energized by electric current source. It is entirely within the scope of the present invention to induce vertical dipole electric fields in the subsurface, as well as to induce vertical and/or horizontal dipole magnetic fields in the subsurface using alternative transmitter structures such as wire loops or solenoid coils. Accordingly, the polarization direction of and the type of electromagnetic field induced is not intended to limit the scope of the present invention. Further, the invention is applicable to use with both frequency domain (continuous wave) and transient induced electromagnetic fields, as suggested above. See, for example, U.S. Patent Application Publication No. 2006/0186887 filed by Strack et al. for examples of all of the foregoing techniques for inducing an electromagnetic field in the subsurface.

Figure 2:
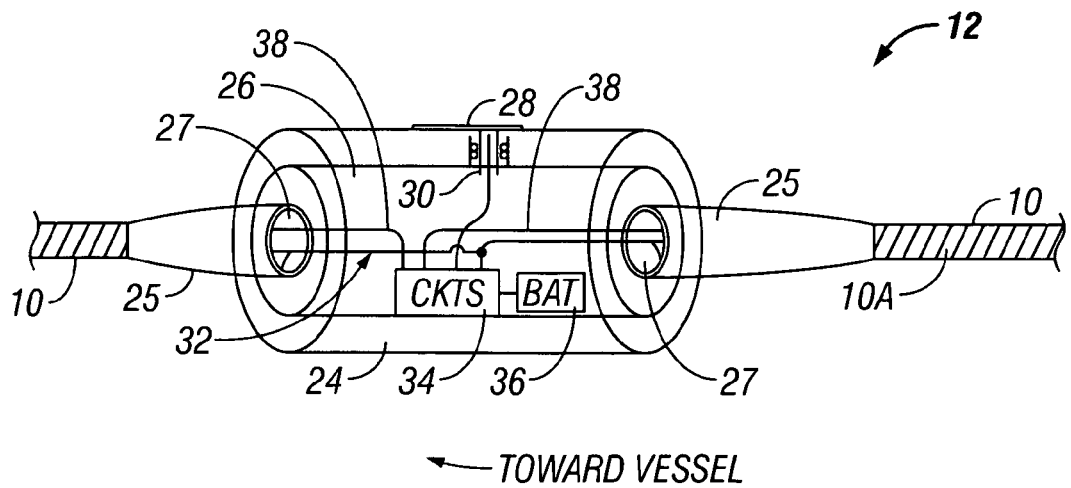
FIG. 2 shows more detail of one example of a sensor module in the cable system of FIG. 1.

One example of a sensor cable 10 and one of the sensor modules 12 is shown in more detail in FIG. 2. The sensor cable 10 may be made from helically wound, electrically conductive armor wires 10A, such as may be made from steel or other high strength material. Preferably the armor wires 10A are covered on their exterior with an electrically insulating jacket (not shown). In one example, to be explained in more detail below the cable 10 may include one or more insulated electrical conductors and one or more optical fibers inside the armor wires 10A.

The sensor cable 10 in the present example may be divided into segments, each of which terminates with a combination mechanical/electrical/optical connector 25 ("cable connector") coupled to the longitudinal ends of each cable segment. The cable connector 25 may be any type known in the art to make electrical and optical connection, and to transfer axial loading to a mating connector 27. In the present example such mating connector 27 can be mounted in each longitudinal end of one of the sensor modules 12. The connectors 25, 27 resist entry of fluid under pressure when the connectors 25, 27 are coupled to each other.

The sensor module housing 24 is preferably pressure resistant and defines a sealed interior chamber 26 therein. The housing 24 may be made from electrically non-conductive, high strength material such as glass fiber reinforced plastic, and should have a wall thickness selected to resist crushing at the maximum expected hydrostatic pressure expected to be exerted on the housing 24. The mating connectors 27 may be arranged in the longitudinal ends of the housing 24 as shown in FIG. 2 such that axial loading along the cable 10 is transferred through the housing 24 by the coupled cable connectors 25 and mating connectors 27. Thus, the sensor cable 10 may be assembled from a plurality of connector-terminated segments each coupled to a corresponding mating connector on a sensor module housing 24. Alternatively, the cable 10 may include armor wires 10A extending substantially continuously from end to end, and the sensor modules 12 may be affixed to the exterior of the armor wires 10A.

A measuring electrode 28 may be disposed on the outer surface of the housing 24, and may be made, for example, from lead, gold, graphite or other corrosion resistant, electrically conductive, low electrode potential material. Electrical connection between the measuring electrode 28 and measuring circuits 34 disposed inside the chamber 26 in the housing 24 may be made through a pressure sealed, electrical feed through bulkhead 30 disposed through the wall of the housing 24 and exposed at one end to the interior of the chamber 26. One such feed through bulkhead is sold under model designation BMS by Kemlon Products, 1424 N. Main Street, Pearland, Tex. 77581.

The measuring circuits 34 may be powered by a battery 36 disposed inside the chamber 26 in the housing 24. Battery power may be preferable to supplying power from the recording system (20 in FIG. 1) over insulated electrical conductors in the sensor cable 10 so as to reduce the possibility of any electromagnetic fields resulting from current flowing along the cable 10 from interfering with the electromagnetic survey measurements made in the various sensor modules 12.

The cable 10 may include one or more optical fibers 38 for conducting command signals, such as from the recording unit (20 in FIG. 1) to the circuits 34 in the various sensor modules 12, and for conducting signal telemetry from the modules 12 to the recording unit (20 in FIG. 1) or to a separate data storage device (not shown). An insulated electrical conductor 32 forming part of the cable (10 in FIG. 2) may pass through the chamber 26 in the housing 24 such that electrical continuity in such conductor 32 is maintained along substantially the entire length of the cable 10. Optical telemetry may be preferable to electrical telemetry for the same reason as using batteries for powering the circuits 34, namely, to reduce the incidence of electromagnetic fields caused by electrical current moving along the cable 10. The insulated electrical conductor 32 in the present example serves as a common potential reference between all of the sensor modules 12. The common potential reference is coupled to the measuring circuits 34 in each sensor module 12.

Returning to FIG. 1, at respective longitudinal ends of the sensor cable 10, each of a pair of calibration source electrodes may be disposed. The calibration source electrodes are shown at 13A and 13B. In the present example, the calibration source electrodes 13A, 13B are disposed on the sensor cable 10 so as to include all the sensor modules 12 between them. In other examples, additional pairs of such calibration source electrodes (not shown) may be disposed on the sensor cable 10 so as to include between the electrodes in each such calibration source electrode pair a selected number of the modules 12.

The recording system 20 in the present example may include therein a calibration power supply 15. The recording system 20 can be configured to operate the calibration power supply 15 at selected times during operation of the acquisition system. The calibration power supply 15 may be configured to generate, for example, sinusoidal alternating current at one or more selected frequencies, preferably within a range of 10 to 1000 Hz. The calibration power supply output is applied across the calibration source electrodes 13A, 13B. The voltage output of the calibration power supply 15 may be set so that the amount of current imparted across the electrodes 13A, 13B is on the order of a few to several tens of milliamperes. The configuration shown in FIG. 1 is such that the current density will be highest along a straight line (along the sensor cable 10) between the calibration source electrodes 13A, 13B. The current density falls off rapidly outward from the sensor cable 10, and the current applied by the calibration power supply 15 to the calibration source electrodes 13A, 13B is such that only a substantially undetectable electromagnetic field therefrom affects the subsurface formations below the water bottom 23. The frequency range of the calibration power supply 15 and the amount of current applied thereby may be considered to be a compromise between the frequency response range of electrodes (28 in FIG. 2) on the sensor modules 20, the electromagnetic field attenuation with respect to distance from the sensor cable 10 and the skin effect.

In operating the system shown in FIG. 1, when the sensor cable 10 is first deployed in the water, the calibration power supply 15 may be actuated, and voltage impressed across the common potential reference (electrical conductor 32 in FIG. 2) and the electrodes (28 in FIG. 2) in each sensor module 20 may be measured. The foregoing measurements may be used as a reference for subsequent measurements of the same parameters. During operation of the system shown in FIG. 1, at selected times after the initial deployment of the sensor cable 10, the calibration power supply 15 may be again actuated and the impressed voltages may be measured. Variations in the measured voltages at certain electrodes may correspond to changes in sensitivity of such electrodes (e.g., 28 in FIG. 2). Measurements made by such electrodes during operation of the transmitter (e.g., by imparting current across electrodes 16) may be scaled to cancel any changes in sensitivity of the various electrodes determined during operation of the calibration power supply 15.

It is also possible using measurements made during operation of the calibration power supply 15 to estimate motion of the sensor cable through the water for determining an amount of the total signal measured during transmitter operation that results from electromagnetic induction caused by such motion. Motion induced signals may be present in sidebands of the current used to energize the calibration source electrodes, and, for example, measurement of the amplitude of the sideband energy may be used to infer motion of the sensor cable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic sensor calibration system, comprising:
    an electromagnetic sensor cable having at least one electromagnetic field sensor thereon, the sensor cable configured to be suspended at a selected distance above a bottom of a body of water;
    a first calibration source electrode disposed on the cable on one side of the at least one sensor;
    a second calibration source electrode disposed on the cable on an opposite side of the at least one sensor;
    a calibration power supply functionally coupled to the first and second calibration source electrodes, the power supply configured to apply a current to the first and second calibration source electrodes which induces substantially no detectable electromagnetic field in formations disposed below the bottom of the body of water; and
    a measuring circuit functionally coupled to the at least one sensor.

2. The system of claim 1 wherein the at least one sensor comprises a measuring electrode and a common potential reference.

3. The system of claim 1 wherein the calibration power supply comprises a source of sinusoidal alternating current having a selected frequency range.

4. The system of claim 3 wherein the selected frequency range is about 10 to 1000 Hz.

5. The system of claim 1 further comprising a plurality of electromagnetic sensors disposed at spaced apart locations along the sensor cable between the first calibration source electrode and the second calibration source electrode.

6. A method for calibrating marine electromagnetic surveying electrodes, comprising:
    first imparting an alternating electric current between calibration source electrodes disposed at spaced apart locations on a cable deployed in a body of water at a selected distance above a bottom thereof;
    wherein the current imparted between the calibration source electrodes is selected to induce substantially no detectable electromagnetic field in formations disposed below a bottom of the body of water;
    detecting voltages impressed between at least one detector electrode and a common potential reference disposed between the calibration source electrodes in response to the alternating current;
    repeating the imparting alternating electric current and detecting voltages; and
    determining a change in sensitivity of the at least one detector electrode using a change in the detected voltages between the first imparting and the repeating imparting.

7. The method of claim 6 further comprising detecting voltages impressed across the at least one detector electrode and the common potential reference in response to an electromagnetic field imparted into formations below a bottom of the body of water, and scaling the voltages detected therefrom by changes in sensitivity determined from the voltages detected in response to the passing alternating current through the calibration source electrodes.

8. The method of claim 7 wherein the electromagnetic field imparted into the formations below the bottom of the body of water is generated by passing electric current through a transmitter.

9. The method of claim 8 wherein the transmitter comprises a pair of spaced apart electrodes.

10. The method of claim 8 wherein the electric current passed through the transmitter comprises at least one of alternating current, and switched direct current, switching thereof comprising one of switching on, switching off, reversing polarity and coded sequence switching.

* * * * *